US010591643B2

(12) United States Patent
Lin et al.

(10) Patent No.: US 10,591,643 B2
(45) Date of Patent: Mar. 17, 2020

(54) LIGHT-FIELD IMAGING USING A GRADIENT METASURFACE OPTICAL ELEMENT

(71) Applicant: The Board of Trustees of the Leland Stanford Junior University, Stanford, CA (US)

(72) Inventors: Dianmin Lin, Los Altos, CA (US); Mark L. Brongersma, Redwood City, CA (US); Pieter G. Kik, Orlando, FL (US); Gordon Wetzstein, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 44 days.

(21) Appl. No.: 15/358,114

(22) Filed: Nov. 21, 2016

(65) Prior Publication Data
US 2017/0146806 A1    May 25, 2017

Related U.S. Application Data

(60) Provisional application No. 62/286,911, filed on Jan. 25, 2016, provisional application No. 62/258,364, filed on Nov. 20, 2015.

(51) Int. Cl.
*G02B 1/00* (2006.01)
*G02B 3/00* (2006.01)
(Continued)

(52) U.S. Cl.
CPC ............ *G02B 1/002* (2013.01); *G02B 1/007* (2013.01); *G02B 3/0043* (2013.01);
(Continued)

(58) Field of Classification Search
CPC ...... G02B 3/00; G02B 3/0006; G02B 3/0037; G02B 3/0043; G02B 3/005; G02B 3/0056;
(Continued)

(56) References Cited

U.S. PATENT DOCUMENTS 7,864,394 B1 * 1/2011 Rule .................... B82Y 20/00
359/241
8,803,738 B2 * 8/2014 Nguyen ............... H01Q 19/062
343/700 MS
(Continued)

FOREIGN PATENT DOCUMENTS

WO    WO-2015170080 A1 * 11/2015

OTHER PUBLICATIONS

Kim et al. "Metannaterials and Imaging." Springer, Nano Convergence (2015), 2:22. DOI 10.1186/s40580-015-0053-7 (Year: 2015).*
(Continued)

*Primary Examiner* — Nicholas R. Pasko
(74) *Attorney, Agent, or Firm* — KPPB LLP

(57) ABSTRACT

Embodiments of 3D imaging systems that use a multifunctional, nano structured metalens to replace the conventional microlens array in light field imaging are disclosed. The optical focusing properties of the metalenses provided by gradient metasurface optical elements. The gradient metasurfaces allow the properties of the elements of the metalens array to be changed by tuning the gradient metasurfaces.

21 Claims, 19 Drawing Sheets

(51) Int. Cl.
  *G02B 21/36* (2006.01)
  *G02B 21/00* (2006.01)
  *H04N 13/204* (2018.01)

(52) U.S. Cl.
  CPC ......... *G02B 3/0056* (2013.01); *G02B 3/0062* (2013.01); *G02B 3/0068* (2013.01); *G02B 21/004* (2013.01); *G02B 21/361* (2013.01); *G02B 21/367* (2013.01); *H04N 13/204* (2018.05)

(58) Field of Classification Search
  CPC .... G02B 3/0062; G02B 3/0068; G02B 1/002; G02B 1/007
  USPC .................................................. 359/462–477
  See application file for complete search history.

(56) References Cited

U.S. PATENT DOCUMENTS

| | | | | |
|---|---|---|---|---|
| 9,829,717 | B1* | 11/2017 | Walsh | G02B 27/4261 |
| 9,995,930 | B2* | 6/2018 | Arbabi | G02B 27/0031 |
| 2011/0188032 | A1* | 8/2011 | Verma | G01N 21/00 356/237.2 |
| 2011/0204891 | A1* | 8/2011 | Drake | G01N 24/084 324/309 |
| 2015/0219806 | A1* | 8/2015 | Arbabi | G02B 5/1828 359/573 |
| 2015/0309218 | A1* | 10/2015 | Shalaev | G02B 1/002 359/241 |
| 2016/0077261 | A1* | 3/2016 | Arbabi | G02B 5/3025 359/493.01 |
| 2016/0306079 | A1* | 10/2016 | Arbabi | G02B 5/0263 |
| 2017/0219739 | A1* | 8/2017 | Lin | G02B 1/002 |

OTHER PUBLICATIONS

Cohen et al. "Enhancing the performance of the light field microscope using wavefront coding." Optics Express, vol. 22, No. 20, Oct. 3, 2014, p. 24817-24839. DOI:10.1364/OE.22.024817 (Year: 2014).*
Kim et al. "Metamaterials and Imaging." Springer, Nano Convergence (2015), 2:22. DOI 10.1186/s40580-015-0053-7 (Year: 2015).*
Lin et al. "Dielectric gradient metasurface optical elements." Science, vol. 345, No. 6194, Jul. 18, 2014, p. 298-302. DOI: 10.1126/science.1253213 (Year: 2014).*
Ma et al. "Extraordinary light focusing and Fourier transform properties of gradient-index metalenses." Physical Review B 84, 195142 (2011). DOI: 10.1103/PhysRevB.84.195142 (Year: 2011).*
Zhan et al. "Low-contrast dielectric metasurface optics." ACS Photonics. Nov. 16, 2015. DOI: 10.1021/acsphotonics.5b00660 (Year: 2015).*
Lager et al. "Interleaved array antennas for FMCW Radar applications." IEEE Transactions on Antennas and Propogation, vol. 57, No. 8, Aug. 2009. p. 2486-2490. DOI: 10.1109/TAP.2009.2024573 (Year: 2009).*
Abrahamsson et al., "Fast multicolor 3D imaging using aberration-corrected multifocus microscopy", Nature Methods, Jan. 2013, vol. 10, No. 1, pp. 60-63.
Arbabi et al., "Dielectric Metasurfaces for Complete Control of Phase and Polarization with Subwavelength Spatial Resolution and High Transmission", Nature Nanotechnology, Aug. 31, 2015, 27 pgs., doi:10.1038/nnano.2015.186.
Berry, "The Adiabatic Phase and Pancharatnam's Phase for Polarized Light", Journal of Modern Optics, 1987, vol. 34, No. 11, pp. 1401-1407.
Bomzon et al., "Pancharatnam-Berry phase in space-variant polarization-state manipulations with subwavelength gratings", Optics Letters, Sep. 15, 2011, vol. 26, No. 18, pp. 1424-1426.
Broxton et al., "Wave optics theory and 3-D deconvulution for the light field microscope", Optics express, Oct. 21, 2013, vol. 21, No. 21, pp. 25418-25439.
Levoy et al., "Light Field Microscopy", ACM Transactions on Graphics, 2006, SIGGRAPHY, vol. 25, No. 3, pp. 1-11.
Pancharatnam, "Generalized theory of interference, and its applications", Proc. Indian Acad. Sci.—Sect. A 44, 247-262 (1956).
Prevedel et al., "Simultaneous whole-animal 3D-imaging of neuronal activity using light-field microscopy", Nat Methods, Jul. 2014, vol. 11, No. 7, pp. 727-730, (author manuscript) doi: 10.1038/nmeth.2964.
Verslegers et al., "Planar Lenses Based on Nanoscale Slit Arrays in a Metallic Film", Nano Letters, 2009, vol. 9, No. 1, pp. 235-238.
Yu et al., "Light Propagation with Phase Discontinuities: Generalized Laws of Reflection and Refraction", Science, Oct. 21, 2011, vol. 334, No. 6054, pp. 333-337, doi: 10.1126/science.1210713.

* cited by examiner

LIGHT-FIELD IMAGING USING A GRADIENT METASURFACE OPTICAL ELEMENT

CROSS-REFERENCE TO RELATED APPLICATIONS

The current application claims priority to U.S. Provisional Patent Application No. 62/258,364, filed Nov. 20, 2015 and U.S. Provisional Patent Application No. 62/286,911 filed Jan. 25, 2016, the disclosures of which are incorporated herein by reference as if set forth herein in their entirety.

FIELD OF THE INVENTION

This invention relates to light-field imaging and more particularly to light-field imaging using gradient metasurface microlenses.

BACKGROUND OF THE INVENTION

Light-field imaging has attracted wide attention because of its ability to achieve simultaneous three-dimensional (3D) imaging by capturing projections of four-dimensional (4D) light fields and using the 4D light fields to reconstruct 3D volumes as explained in more detail in Levoy, M., Ng, R., Adams, A., Footer, M. & Horowitz, M. Light field microscopy. *ACM Trans. Graph.* 25, 924 (2006). Traditional light-field imaging systems use arrays of spatially separated microlenses. In these traditional systems, both the lateral and axial information of an object can be recorded simultaneously, but there is an inherent trade-off between the lateral and axial resolutions. For example, conventional light-field microscopy can image large volumes at high speed but suffers from a decreased spatial resolution compared to a conventional microscope.

To improve the spatial resolution, a deconvolution algorithm based on a wave optics model has been developed to reconstruct 3D volumes with high spatial resolution as described in more detail in Broxton, M., Grosenick, L., Yang, S., Cohen, N., Andalman, A., Deisseroth, K. & Levoy, M. Wave optics theory and 3-D deconvolution for the light field microscope. *Opt. Express* 21, 25418-25439 (2013) and Prevedel, R., Yoon, Y.-G., Hoffmann, M., Pak, N., Wetzstein, G., Kato, A., Schrodel, T., Raskar, R., Zimmer, M., Boyden, E. S., et al. Simultaneous whole-animal 3D imaging of neuronal activity using light-field microscopy. *Nat Meth* 11, 727-730 (2014). However, the spatial resolutions of the reconstructions using the deconvolution algorithms have been shown to be non-uniform across their depth. To enhance the performance of the light-field microscope, wavefront coding techniques, in which phase masks are added into the optical path, have been proposed in Cohen, N., Yang, S., Andalman, A., Broxton, M., Grosenick, L., Deisseroth, K., Horowitz, M. & Levoy, M. Enhancing the performance of the light field microscope using wavefront coding. *Opt. Express* 22, 24817-24839 (2014). However, the superior performance of this approach has been demonstrated only in simulation because it is extremely challenging to create the phase mask on each lenslet using conventional optics techniques. A different approach for simultaneous 3D imaging based on multi-focus microscopy and diffractive optical elements was proposed in Abrahamsson, S., Chen, J., Hajj, B., Stallinga, S., Katsov, A. Y., Wisniewski, J., Mizuguchi, G., Soule, P., Mueller, F., Darzacq, C. D., et al. Fast multicolor 3D imaging using aberration-corrected multi-focus microscopy. *Nat Meth* 10, 60-63 (2013). However, this approach can probe only the image information on a limited number of discrete planes and does not capture the true 4D light fields. Therefore, novel optical elements are highly desired to address the inherent trade-off between spatial resolution and angular resolution in conventional light-field imaging.

Metasurfaces, essentially 2D optical elements, are promising candidates for replacing bulky optical components. A more complete description of metasurfaces are given in Verslegers, L., Catrysse, P. B., Yu, Z. F., White, J. S., Barnard, E. S., Brongersma, M. L. & Fan, S. H. Planar Lenses Based on Nanoscale Slit Arrays in a Metallic Film. *Nano Lett.* 9, 235-238 (2009); Yu, N. F., Genevet, P., Kats, M. A., Aieta, F., Tetienne, J. P., Capasso, F. & Gaburro, Z. Light Propagation with Phase Discontinuities: Generalized Laws of Reflection and Refraction. *Science* 334, 333-337 (2011); Arbabi, A., Horie, Y., Bagheri, M. & Faraon, A. Dielectric metasurfaces for complete control of phase and polarization with subwavelength spatial resolution and high transmission. *Nat Nanotechnol* (2015). doi:10.1038/nnano.2015.186; and Lin, D. M., Fan, P. Y., Hasman, E. & Brongersma, M. L. Dielectric gradient metasurface optical elements. *Science* 345, 298-302 (2014). Gradient metasurfaces include dense arrangements of resonant optical antennas with space-varying properties and offer tremendous freedom in manipulating optical wave-fronts by imparting local, space-variant phase-changes on an incident electromagnetic wave.

Recently, gradient metasurface have been provided using dielectric gradient metasurface optical elements (DGMOEs) as described in Lin, D. M., Fan, P. Y., Hasman, E. & Brongersma, M. L. Dielectric gradient metasurface optical elements. *Science* 345, 298-302 (2014). DGMOES are capable of achieving high diffraction efficiencies in transmission mode in the visible spectrum. Ultrathin gratings, lenses, and axicons have been demonstrated by patterning a 100-nm-thin Si layer into a dense arrangement of Si nano-beam-antennas. More recently, interleaved metasurface optical elements with multi-functionalities have been designed to achieve a high packing density of distinct optical elements on a surface, without reducing the numerical aperture of each sub-element. In addition to being ultrathin and compact, these multifunctional metasurfaces can provide entirely new functions that are very difficult or impossible to be achieved with conventional optical components.

SUMMARY OF THE INVENTION

The above and other problems are solved and an advance in the art is made by a multiplexed metalens array for a light imaging system configured in the following manner in accordance with some embodiments of the invention. The metalens array is made of dielectric gradient metasurface optical elements and includes interleaved sub-elements. At least two of the interleaved elements have different optical functionalities and a phase profile of the multiplexed metalens array is a spatial multiplexing of the plurality of sub-elements.

In accordance with some embodiments of the invention, each of the sub-elements have a different optical axis. The at least two of the sub-elements may also have a different aperture in accordance with many embodiments and/or a different focal length.

In accordance with a number of embodiments, each of the sub-elements is encoded with a coded aperture. In accordance with several embodiments, the sub-elements manipulate different states of polarization.

In accordance with some embodiments, dielectric gradient metasurface optical elements are silicon nanobeam antennas with a phase profile based on geometric phase.

In accordance with a number of embodiments, there are N sub-elements and an intensity, I, of an image generated decreases as a function of N such as $N:I\sim 1/N^2$.

In accordance with some embodiments, the metalens array is included in a field light imaging system that also includes at least one tube lens wherein one of the at least one tube lens is associated with one of the plurality of sub-elements to project an image from the one of the plurality of sub-elements onto a focal plane. In accordance with some of these embodiments, the sub-elements include N sub-elements and the at least one tube lens includes N tube lenses and each of the N sub-elements is associated with one of the N lens tubes to project the image from the one element onto the focal plane. In accordance with some other embodiments, the sub-elements include N sub-elements and the at least one tube lens includes one lens tube and each of the N sub-elements is associated with the one tube lens to project an image onto the focal plane.

DETAILED DISCLOSURE OF THE INVENTION

Figure 1:
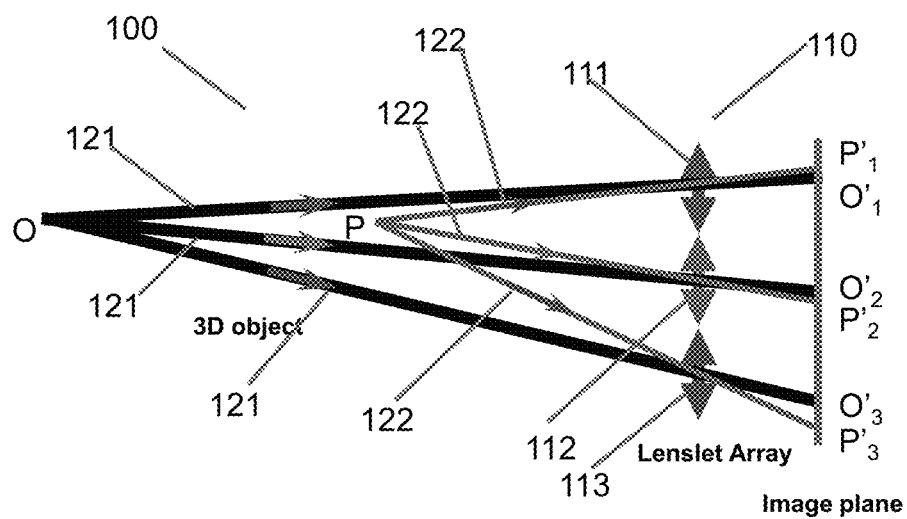
FIG. 1 illustrates a conventional light field imaging system that has a conventional lenslet array.

Turning now to the drawings, various embodiments of systems and methods that perform light field imaging using gradient metasurface optical elements are disclosed. The multiplexed metalens array is provided by a gradient metasurface optical element in accordance with some embodiments of the invention. The multiplexed metalens array includes multiple interleaved sub-elements. Each of the sub-elements may have different optical functionalities in accordance with many embodiments of the invention. In accordance with some of these embodiments, a phase profile of multiplexed metalens array is a spatial multiplexing of the phase profile of N sub-elements where N is the number of sub-elements.

In accordance with some embodiments, each of the N sub-elements included in the multiplexed metalens array have a different optical axis. Thus, each of the N sub-elements can capture the information from different perspectives. In accordance with many embodiments, the N sub-elements with parabolic lens profiles with different optical axis, but the same focal length and same aperture/diameter. In accordance with a number of embodiments, the N sub-elements can have different aperture/diameter. In accordance with some other embodiments, the N sub-elements can have different focal length.

In accordance with some embodiments, the N sub-elements can have phase profiles which are encoded with a coded aperture for superior optical functionalities. Wavefront coding techniques (coded aperture) can be easily integrated into the metalens design by adding a phase plate function to the phase profile of the metalenses. In accordance with many of these embodiments, the coded aperture allows each of the N sub-elements to have different optical elements/functionalities such as, but not limited to lens, axicon, and grating can be included in the multiplexed metalens array.

In accordance with some embodiments, the N sub-elements can be designed to manipulate different states of polarization. In accordance with many embodiments, the N sub-elements can be designed to manipulate different wavelengths of light. In accordance with a number of embodiments, the number of sub-elements, N, can vary from 2 to infinity. However, the intensity of the generated image I will be decreased as a function of N: $I \sim 1/N^2$.

In accordance with some embodiments, the phase profile of a metasurface in the gradient metasurface optical element is based on geometric phase and Si nanobeam antenna. The phase profile design of the multifunctional metalens-arrays is generally applicable to other metasurfaces, including various methods of phase tuning (geometric phase by rotating the orientation nanostructures, effective refractive index by tuning the size of nanostructures), different materials (high-index semiconductor or insulator and metal), and different antenna design (nanobeam, nanofin, ellipse nanoparticle, circular nanoparticle). In addition, the phase profile can be implemented using phase plate optical elements (e.g., diffractive optical elements and liquid crystal lenses), though their fabrication might be more complicated and pixel size of each phase tends to be larger. In accordance with some embodiments, the gradient metasurface lens can be fabricated by parallel lithography techniques for mass production.

In accordance with some embodiments of the invention, a strategy for improving spatial resolution can be applied to light-field displays as well (essentially the reverse of what was described). In accordance with some of these embodiments, the same strategy can be applied to light-field illumination in microscopes. In accordance with some further embodiments, a simple glass slide or optical element is patterned with a metalens, so that simultaneous 3D imaging can be achieved without substantially modifying the optical system of a conventional optical microscope. We have drawn the example of optical system integrated with a multiplexed metalens array. Multiple elements of metalens can be integrated in the optical system.

A more detailed description of systems and methods that perform light field imaging using gradient metasurface optical elements follows.

Light Field Imaging
Imaging Using a Conventional Lens Array

A conventional light field imaging system that has a conventional lenslet array is shown in FIG. 1. Light field imaging system 100 a lenslet array 110 is employed in the imaging system to capture the images from different perspectives. The double-headed arrows 111-113 represent the lenslet array of three positive lenses. Two points at different distances labeled as 'O' and 'P' respectively are the imaged objects. The two image objects are projected to the image plane 120 by three lenslets 111-113. The images of the two objects on the image plane are labeled as $O'_i$ and $P'_i$ (i=1, 2, 3). The optical ray of two objects 'O' and 'P' are lines 121 and 122 respectively. The optical rays going through each lenslet are labeled with the arrow the same reference number. As can be seen from FIG. 1, different depths are projected at different pixel in sub-image of each lens.

By summing pixels at image plane projected from different lenses, one can refocus the object at a different distance. The diameter of conventional lenslet here is only 1/N of the entire elements, where N is the number of lenslet in one direction. The reduced aperture of lenslet results in bigger focal points at the image plane and thus lenslet array has decreased spatial resolution.

Figure 2:
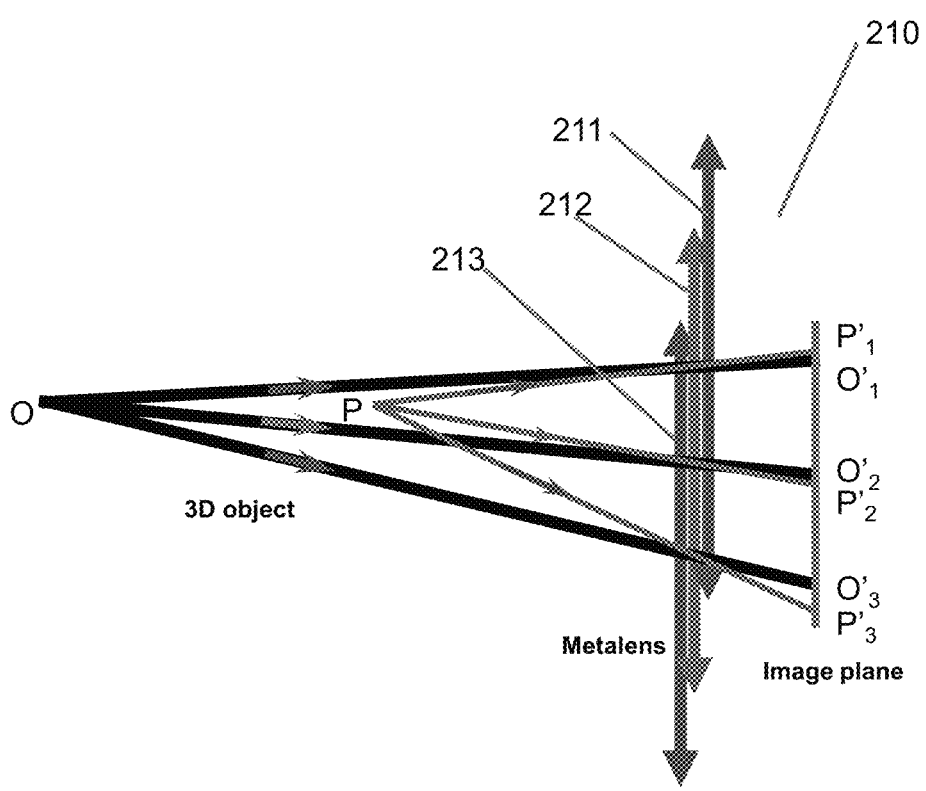
FIG. 2 illustrates a schematic of light field from a light field imaging system having a multiplexed metalens array.
Figure 4:
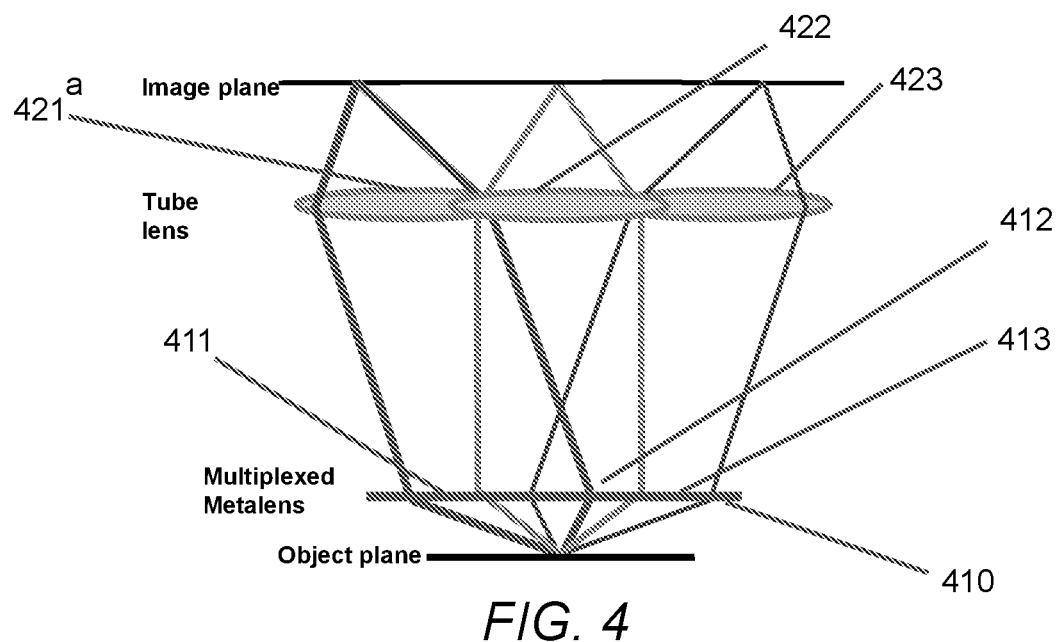
FIGS. 4 and 5 illustrate different subsystems formed by the pair of metalens 411-413 and lens tubes.
Figure 5:
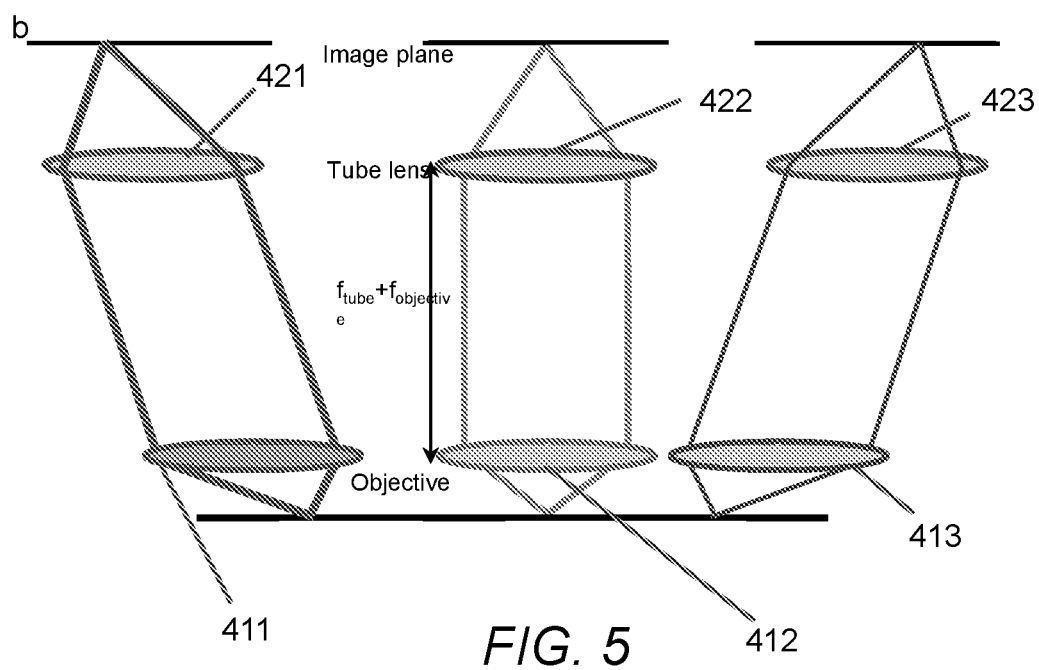

A schematic of light field from a light field imaging system having a multiplexed metalens array is shown in FIG. 2. The design principle of multiplexed metalens array 210 described above with reference to FIG. 1 where each sub-lens 111-113 has the optical axis aligned with that of conventional lenslet array making the locations of the images, O and P, projected by multiplexed metalens array 210 at the image plane are the same as that of conventional lenslet array. In contrast, the diameter of each metalens 211-213 may be extended to the entire region of optical elements. Therefore, the focal spots of the images generated by multiplexed metalens array have smaller spot sizes and thus multiplexed metalens array has higher spatial resolution. The real image generated by a metasurface lens can be directly captured by a CCD placed in the image plane. Therefore, a multiplexed metalens array can be used as a single optical element for a miniaturized imaging system. The different subsystems formed by the pair of metalens 411-413 and lens tubes 421-423 of FIG. 4 are shown in FIG. 5.

Figure 3:
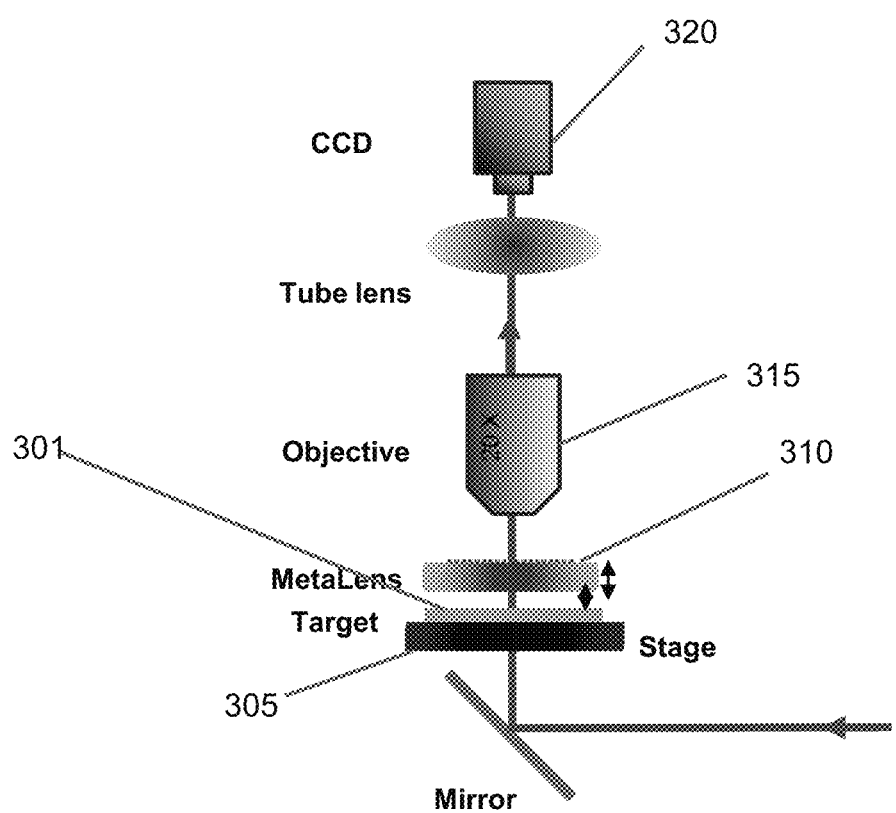
FIG. 3 illustrates an imaging system in a microscope having a metalens array in accordance with an embodiment of the invention.

An imaging system in a microscope having a metalens array is shown in FIG. 3. In FIG. 3, the interleaved multi-functional metalens can be approximated as superposition of multiple sub-lenses of a metasurface 310. Each single full metasurface lens works as a single lens imaging system with designed focal length. The illumination source is a white light supercontinuum source that is wavelength-tunable from 400 to 2200 nm (NKT, SuperK Extreme). A linear polarizer and a quarter wave plate are utilized to generate a circularly polarized illumination beam. The target 301 is mounted on a stage 305. The metasurface lens-array 310 is mounted on an XYZ scan stage with the metasurface facing upwards towards the microscope objective. The real image generated by the metalens is captured by confocal microscope 315 and recorded by a high-resolution CCD camera 320 such as a Princeton Instruments, PIXIS 1024B camera. The distance between target 301 and metalens 310 and distance between metasurface and images, follow the lens equation with modification due to the presence of glass substrate. The magnification of the regenerated images can be changed by adjusting the distance between target 301 and metalens 310.

Imaging System Integrated with a Multiplexed Metalens Array

The integration of metalenses into an optical path of an optical imaging system is straightforward. A microscope optical system where the objective is replaced by a multiplexed metalens array in accordance with an embodiment of the invention is shown in FIGS. 4 and 5. In FIGS. 4 and 5, the multiplexed metalens array 410 has three sub-elements 411-413 that have the same focal length. There are individual tube lenses 421-423 that are paired with sub-elements 411-413 of multiplexed metalens array 410 with each forming a sub-system that capture images from a different view.

Figure 6:
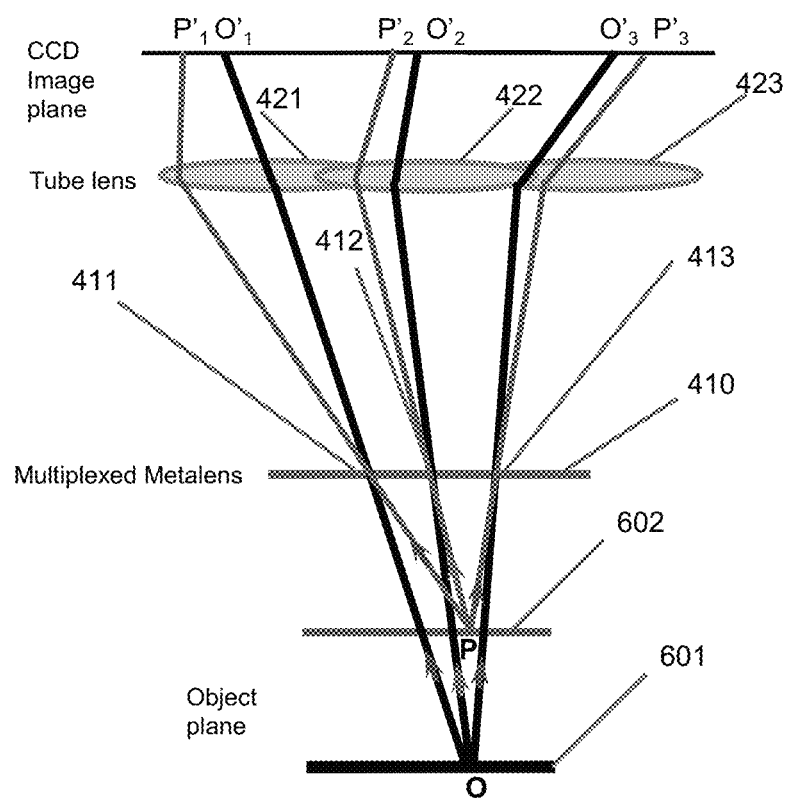
FIG. 6 illustrates an imaging system that has a multiplexed metalens array in accordance with an embodiment of invention.

A manner in which objects at two different depths are imaged by an optical system described in FIG. 4 is shown in FIG. 6. In FIG. 6, the object planes 601 within the depth of field can be projected at different locations in the sub-images on CCD. By reprocessing the image, it is possible to reconstruct the image of a 3D object. Compared to a microscope optical system having a single element, the magnifications from different depths are the same, which is an advantage for imaging.

Figure 7:
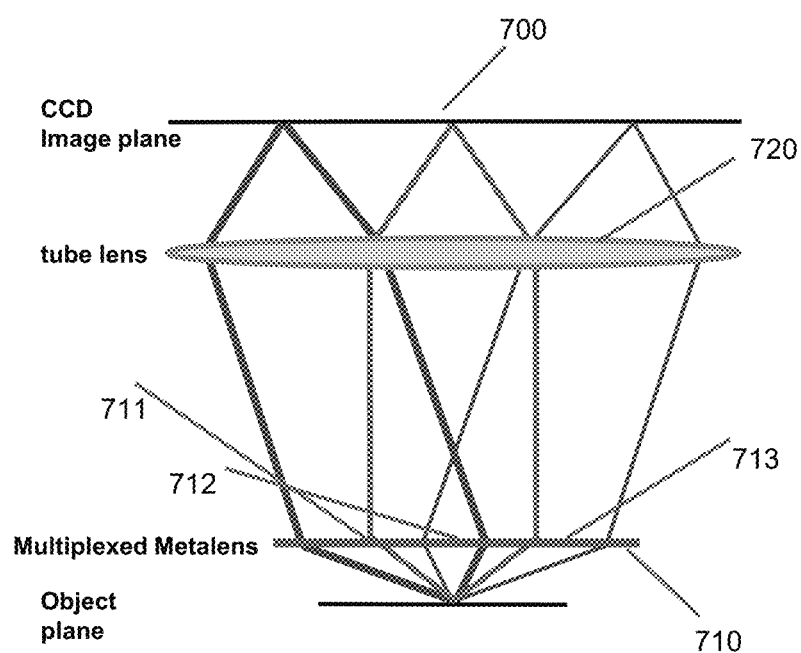
FIG. 7 illustrates an alternative configuration of the imaging system having a metalens array in accordance with an embodiment of the invention.

An alternative configuration of the imaging system having a metalens array in accordance with an embodiment of the invention is shown in FIG. 7. In imaging system 700, there is single tube lens 720 that is aligned with all the sub-elements 611-613 of multiplexed metalens array 610. The single tube lens 720 simplifies the imaging system 700 by using one tube lens, since it is easier to set up only one tube lens in the optical path. But the generated images will be closer to each other, and need to be carefully separated.

Although various embodiments of a light field imaging system with a metalens array are described above, other embodiments of a light field imaging system with metalens arrays in accordance with other embodiments of this invention may be designed.

Imaging System Integrated With a Multi-focus Multiplexed Metalens Array

Figure 8:
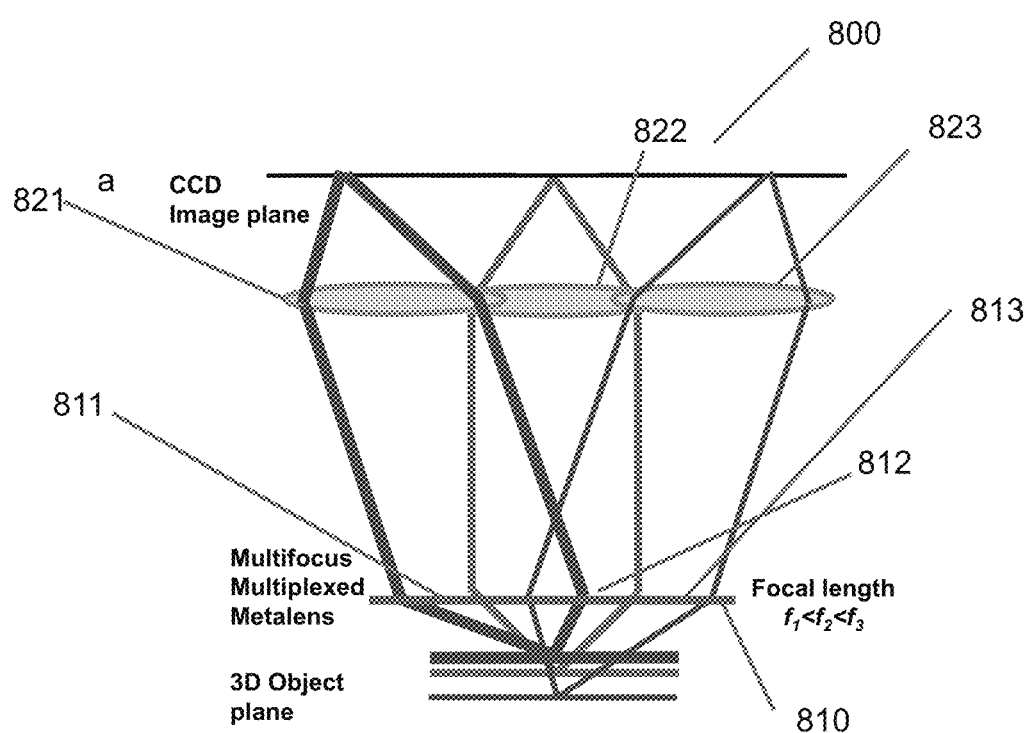
FIG. 8 illustrates the individual subsystems of imaging system in accordance with an embodiment of the invention.

In accordance with some embodiment of this invention, the sub-elements may each have a different focal length. An imaging system integrated with a multi-focus multiplexed metalens array in accordance with an embodiment of the invention is shown in FIG. 8. In imaging system 800, each sub-lens 811-813 has a different focal length (f1<f2<f3). Therefore, it is possible to project the object planes of different depths to different locations (translational shifted) on the same image plane 830. There are individual tube lenses 821-823 that are each paired with one of sub-elements 811-813 of multiplexed metalens array 180 to form a subsystem that captures an image from a different view. The individual subsystems of imaging system 800 in accordance with an embodiment of the invention are shown in FIG. 8.

Figure 9:
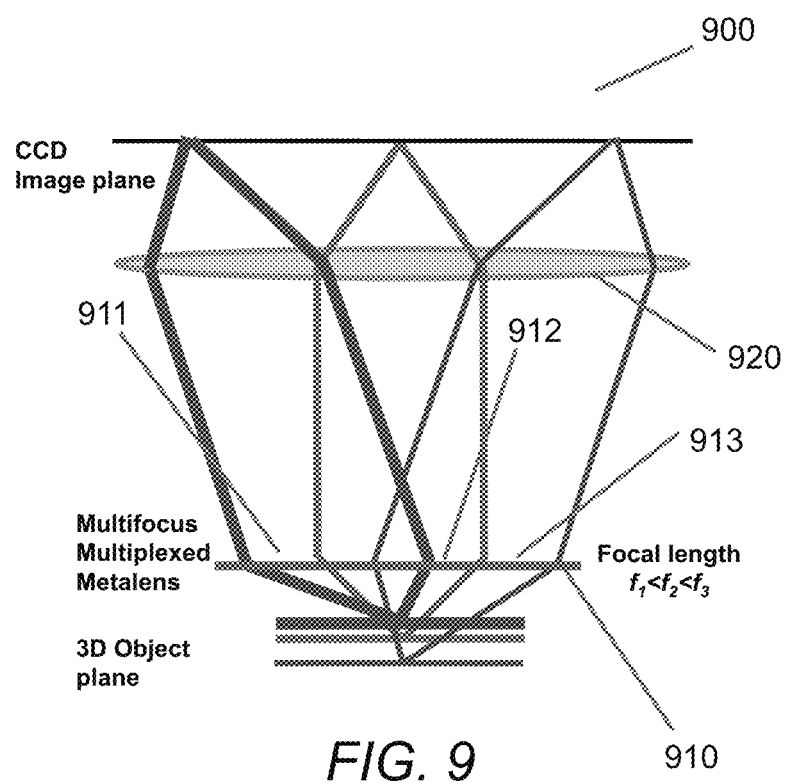
FIG. 9 illustrates an imaging system integrated with a multi-focus multiplexed metalens array having only one tube lens aligned with all the sub-elements of multiplexed metalens array in accordance with an embodiment of the invention.

An imaging system integrated with a multi-focus multiplexed metalens array having only one tube lens aligned with all the sub-elements of multiplexed metalens array in accordance with an embodiment of the invention is shown in FIG. 9. Imaging system 900 is the same as the imaging system 800 except that imaging system 900 has a single lens tube 920 aligned with the sub-elements 911-913 of array 910. Imaging system is simplified by using one tube lens, since it is easier to set up only one tube lens in the optical path. However, the generated images will be closer to each other, which should be carefully separated.

Although various embodiments of an imaging system integrated with a multi-focus multiplexed metalens array are described above with respect to FIGS. 8 and 9, other embodiments may have other configurations without departing from the embodiments of this invention.

Display System Using a Multiplexed Metalens Array

The improvement of spatial resolution using a metalens array can be applied to light-field displays as well. Conventional light-filed displays use a lenslet array to generate a 3D scene with various depths. As such, a light-field display system is essentially the reverse of an imaging system with the CCD at image plane being replaced with Projector (for example: SLM . . . ).

Figure 10:
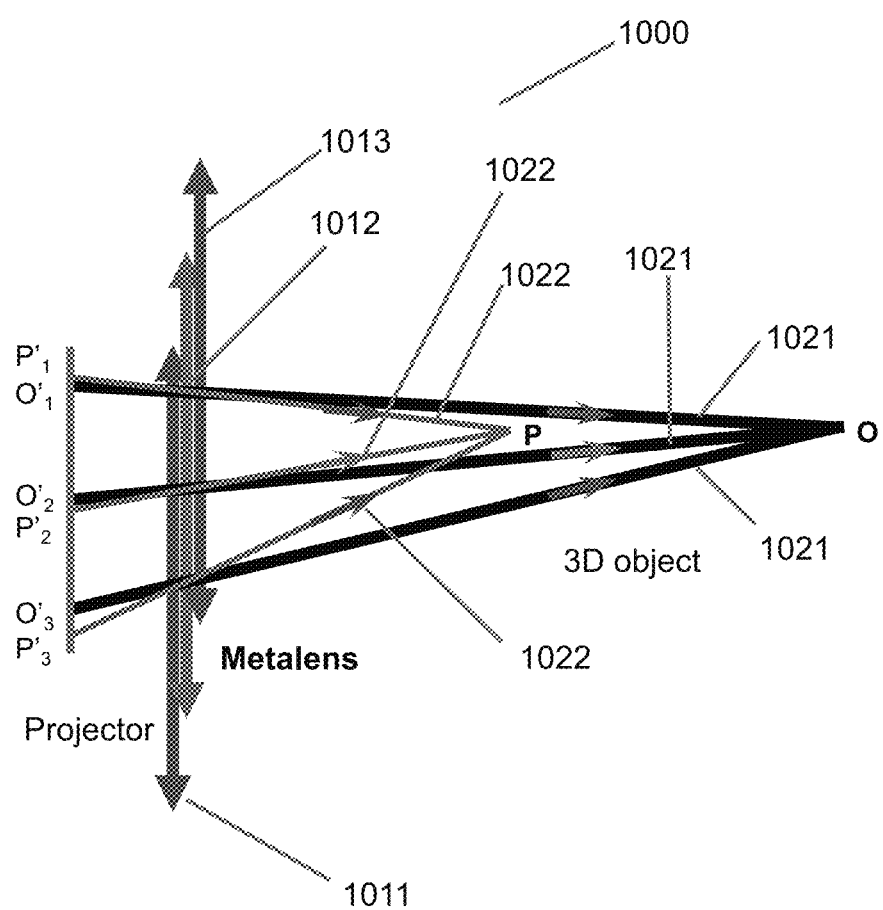
FIG. 10 illustrates a display system using a multiplexed metalens array in accordance with an embodiment of the invention.

A display system using a multiplexed metalens array in accordance with an embodiment of the invention is shown in FIG. 10. Display system 1000 includes a metalens array 1010 with three sub-elements 1011-1013 of positive lenses with extended aperture (i=1, 2, 3). The pixels on the projector for each of the sub-elements 1011-1013, which are labeled as $O'_i$ and $P'_i$ (i=1, 2, 3) respectively, are projected to free-space through the sub-elements 1011-1013 of metalens array 1010.

By using adequate encoding of the pixels on the projector, the rays from each sub-element 1011-1013 will converge to a spot 'O' in the free space. Similarly, by encoding the pixels with different intensity distribution, a spot 'P' at a different depth can be formed. The optical rays that contribute to the two spots of 'O' and 'P' are labels as 1021 and 1022 respectively. Therefore, light-field display 1000 can create a scene with various depths. The multiplexed metalens array 1010 with an extended aperture contributes to the high-resolution display.

Although at least one embodiment of a display system using a multiplexed metalens in accordance with an embodiment of the invention is shown in FIG. 10, other embodiments with various different configurations can be designed without departing from the embodiments of the invention.

Metalens Array with Enhanced Numerical Aperture

Figure 11:
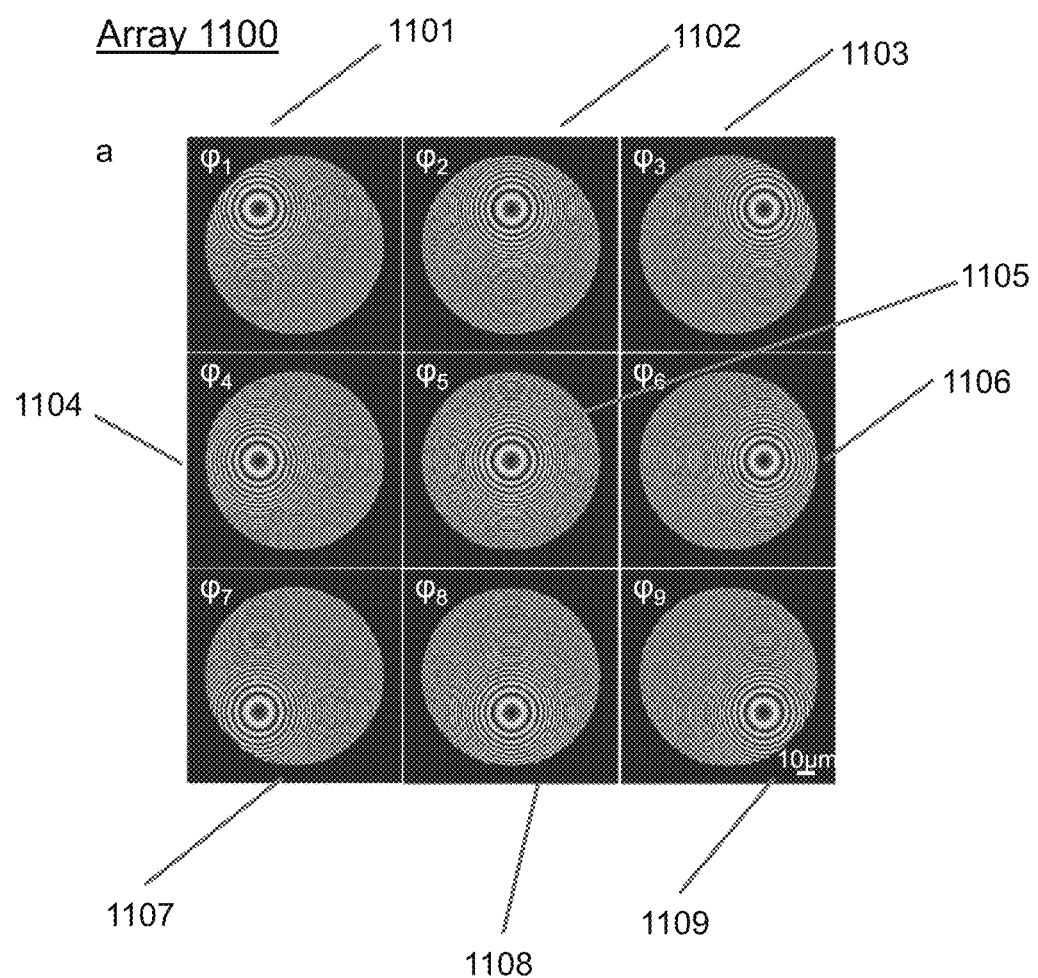
FIG. 11 illustrates a phase profile of a multifunctional dielectric gradient metasurface for a metalens array used in a light-field imaging system in accordance with an embodiment of the invention.

In accordance with some embodiments of the invention, a metalens array such as the metalens arrays described in the above systems are made of multifunctional dielectric gradient metasurface. A phase profile of a multifunctional dielectric gradient metasurface for a metalens array used in a light-field imaging system in accordance with an embodiment of the invention is shown in FIG. 11. The phase profile 1100 of an array of lenses 1101-1109 to be incorporated, which have their optical axes translationally shifted in x and y, which is similar to an off-axis lens. The phase profile of each lens 1101-1109 is shown in Equation 1:

$$\varphi_1(x, y) = 20\pi + \frac{2\pi}{\lambda_1}\left(f - \sqrt{(x+d_x)^2 + (y+d_y)^2 + f^2}\right) \quad \text{(Eq. 1)}$$

$$\varphi_2(x, y) = 20\pi + \frac{2\pi}{\lambda_1}\left(f - \sqrt{x^2 + (y+d_y)^2 + f^2}\right)$$

$$\varphi_3(x, y) = 20\pi + \frac{2\pi}{\lambda_1}\left(f - \sqrt{(x-d_x)^2 + (y+d_y)^2 + f^2}\right)$$

$$\varphi_4(x, y) = 20\pi + \frac{2\pi}{\lambda_1}\left(f - \sqrt{(x+d_x)^2 + y^2 + f^2}\right)$$

$$\varphi_5(x, y) = 20\pi + \frac{2\pi}{\lambda_1}\left(f - \sqrt{x^2 + y^2 + f^2}\right)$$

$$\varphi_6(x, y) = 20\pi + \frac{2\pi}{\lambda_1}\left(f - \sqrt{(x-d_x)^2 + y^2 + f^2}\right)$$

$$\varphi_7(x, y) = 20\pi + \frac{2\pi}{\lambda_1}\left(f - \sqrt{(x+d_x)^2 + (y-d_y)^2 + f^2}\right)$$

$$\varphi_8(x, y) = 20\pi + \frac{2\pi}{\lambda_1}\left(f - \sqrt{x^2 + (y-d_y)^2 + f^2}\right)$$

$$\varphi_9(x, y) = 20\pi + \frac{2\pi}{\lambda_1}\left(f - \sqrt{(x-d_x)^2 + (y-d_y)^2 + f^2}\right)$$

where $d_x$=20 μm and $d_y$=20 μm are the distances between focal spots in the lateral direction along the x and y-axis of the plane of the lens array, respectively, and f=100 μm is the focal length of the lenses at $\lambda_1$=550 in accordance with a particular embodiment of the invention. The diameter of the lens is approximately 100 μm, so each single lens has f/1.0.

Each of the lens 1101-1109 in the array 1100 focuses light in the same focal plane, but the different focal spots are translationally shifted in the focal plane in accordance with some embodiments of the invention. By placing each of the lens 1101-1109 in the imaging system, each lens will image the object from a different viewpoint.

Figure 12:
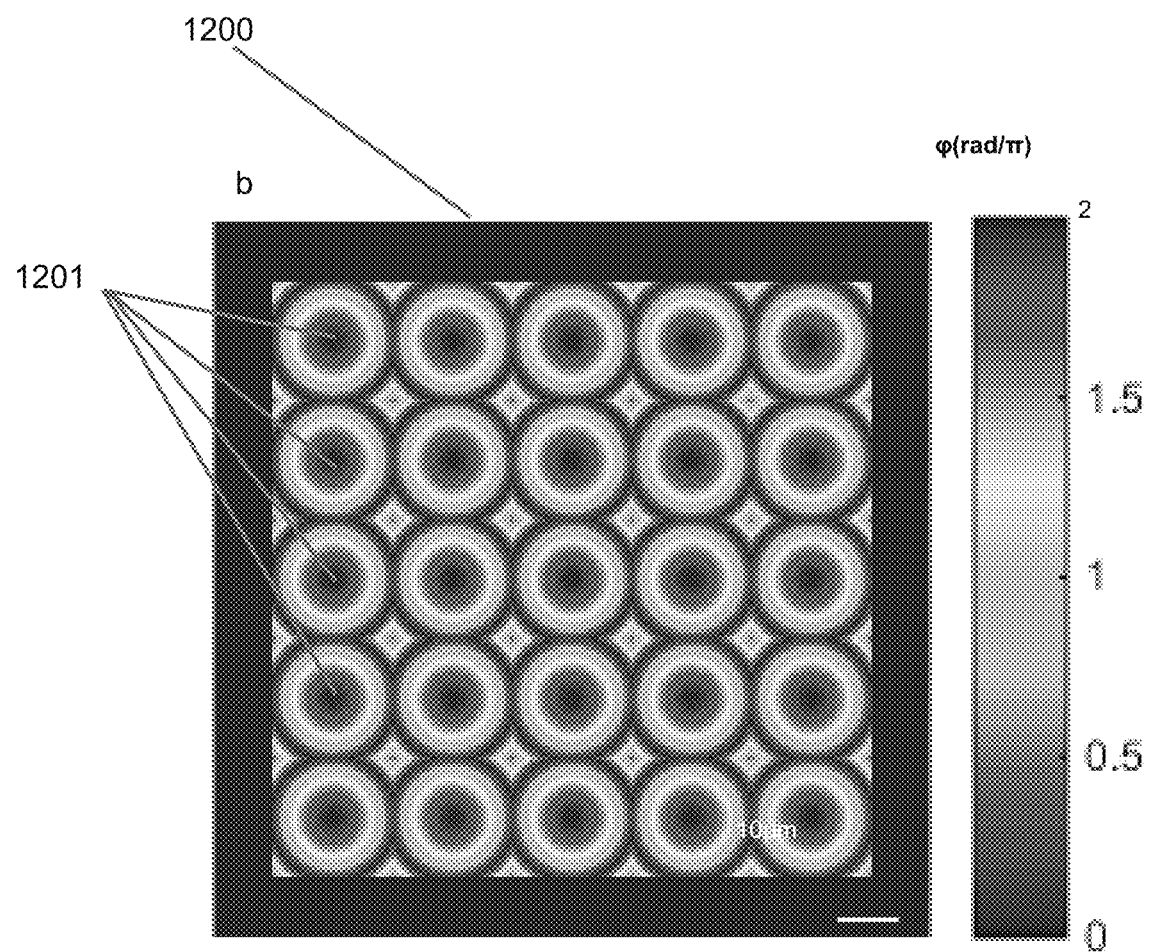
FIG. 12 illustrates a phase profile of a lenslet array in a conventional 3D light-field imaging array.

In conventional 3D light-field imaging, a micro-lens array that consists of a lenslet with off-optical axes is used to capture both the angular and spatial information. The phase profile of a lenslet array in a conventional 3D light-field imaging array is shown in FIG. 12. However, each lenslet 1201 can occupy only a specific area of the whole optical element of lenslet array 1200 because the lenslets are spatially separated. The diameter of the lenslet is equal to the distance between off-axis lenses, and determines the angular resolution. When the distance between axes of the lenslets 1201 (the diameter of the lenslet) is smaller, more points of view are recorded, and thus the angular resolution is higher. At the same time, when the diameter of the lenslet 1201 is smaller, the numerical aperture, which affects the spatial resolution, is decreased. Therefore, there is an inherent tradeoff between the angular resolution and spatial resolution of a microlens array.

Figure 13:
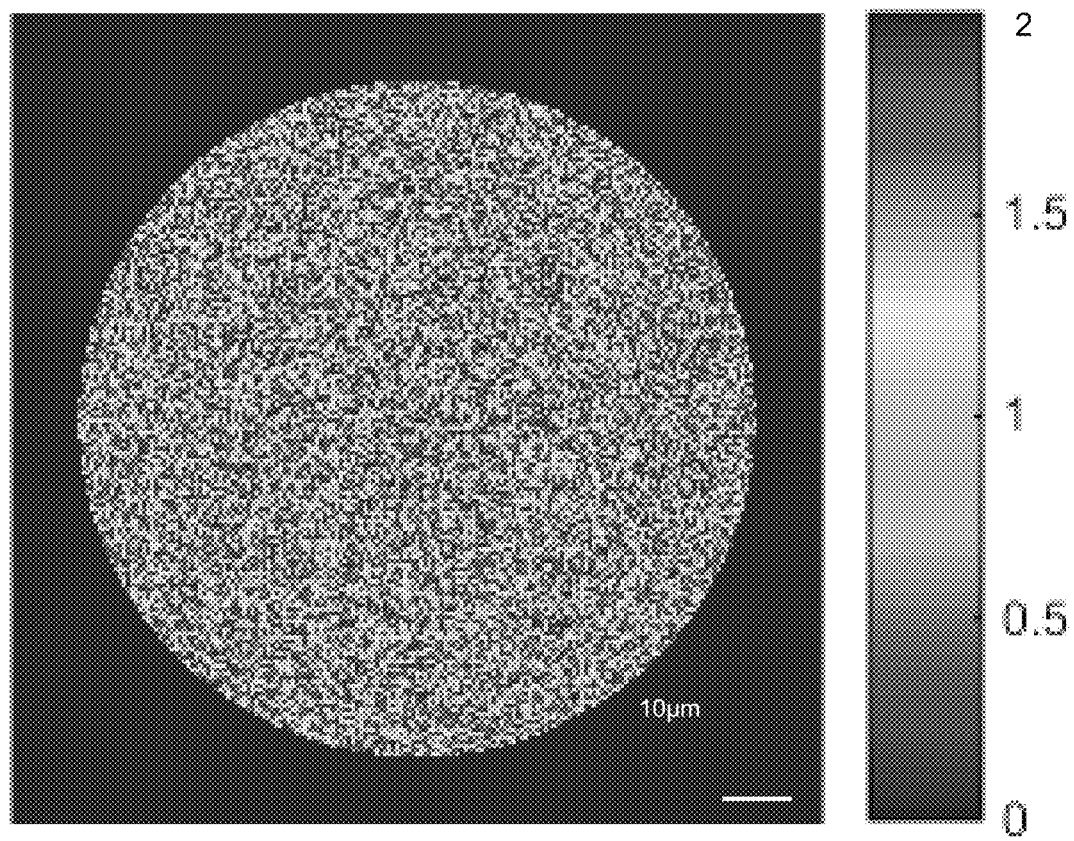
FIG. 13 illustrates a phase profile of lens 1101-1109 of array 1100 in accordance with an embodiment of the invention.

A metalens array such as the metalens array shown in FIG. 11 is a multifunctional optical element to circumvent this trade-off. In accordance with some embodiments of the invention, the phase profile of the multifunctional metalens is composed of the spatially multiplexed phase profiles of an array of lenses, which have their optical axes translationally shifted, as shown in FIG. 11. The multiplexed optical elements 1101-1109 cover the same area as the entire optical element 1200 in the conventional system shown in FIG. 12. The multiplexed optical elements offer an effective aperture for each multiplexed lens 1101-1109 that is equal to that of the entire optical element 1200 rather than that of the individual lenslets 1201-1209 within the larger array. The larger aperture of the multiplexed lenses can be used directly in imaging to achieve a higher spatial resolution. Therefore, the spatially multiplexed design in accordance with some embodiments of the invention facilitates the realization of optical elements with multi-functionalities to achieve a high packing density of distinct optical elements on a surface without reducing the numerical aperture of each sub-element. By interleaving multiple optical elements, we can circumvent the inherent trade-off between spatial resolution and angular resolution in conventional light-field imaging. The phase profiles of lens 1101-1109 of array 1100 in accordance with an embodiment of the invention are shown in FIG. 13 where the scale bar is 10 µm.

Although some embodiments with of a metalens array with enhanced numerical aperture is described above with reference to FIGS. 11-13, other embodiments of metalens array with enhanced numerical apertures can be designed without departing from embodiments of this invention.

Multiplexed Metasurface Lens Array

A multiplexed phase profile with an enhanced numerical aperture can be implemented using a variety of different approaches. However, it is a challenge to fabricate multifunctional optical elements with spatially multiplexed optical functions using conventional optics technology. For example, it is almost impossible to break up several optical elements into small pieces with sizes smaller than 1 µm, randomly select the pieces, and then stick the pieces together. Diffractive optical elements with space-variant thickness can be used to implement the desired phase profile, but it is difficult to make 3D/multi-step surfaces, and therefore the fabrication cost is relatively high. For instance, diffractive optical elements with 8 levels of height can be fabricated by three lithography steps, but the alignment in the lateral direction between each lithography step is difficult (yet critical). Even if such optical elements could be fabricated, the multi-height nature of the elements and the associated height discontinuities could cause scattering or glare.

In accordance with some embodiments of this invention, a phase profile design of multifunctional metasurface is provided using the DGMOEs. DGMOEs can be patterned into perfectly smooth, planar thin films. The phase distribution can be realized by controlling the local orientation angles of Si nanowires of 100 nm thickness and 120 nm width in accordance with some embodiments. When such wires are placed into a dense array, the wires can serve as half-wave plates in accordance with these embodiments. By tiling a surface with half-wave plates with their fast-axes orientations according to a function θ(x, y), an incident circular polarized light beam will be fully transformed to a beam of opposite helicity and imprinted with a geometric phase equal to $\varphi_g(x, y) = \pm 2\theta(x, y)$ in accordance with many embodiments. By controlling the local orientations of the fast-axes of the waveplate elements between 0 and π, phase pickups can be achieved that cover the full 0-2π range while maintaining equal transmission amplitude for the entire optical component in accordance with a number of these embodiments. Each single lens in the array of lenses in FIG. 11 can be realized in to composite metasurface optical element.

Figure 14:
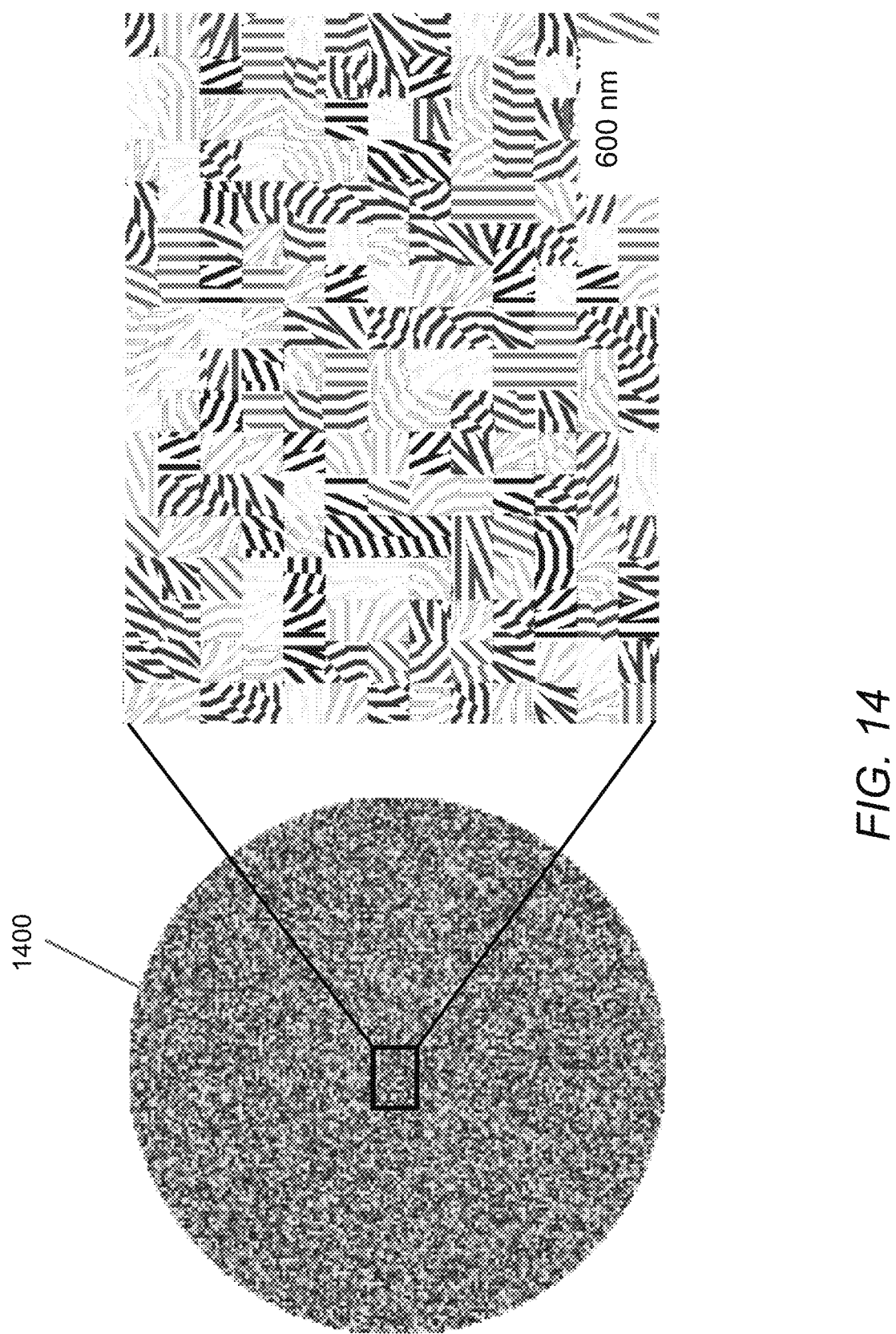
FIG. 14 illustrates a multiplexed metalens that provides an array of lenses in accordance with an embodiment of the invention.
Figure 15:
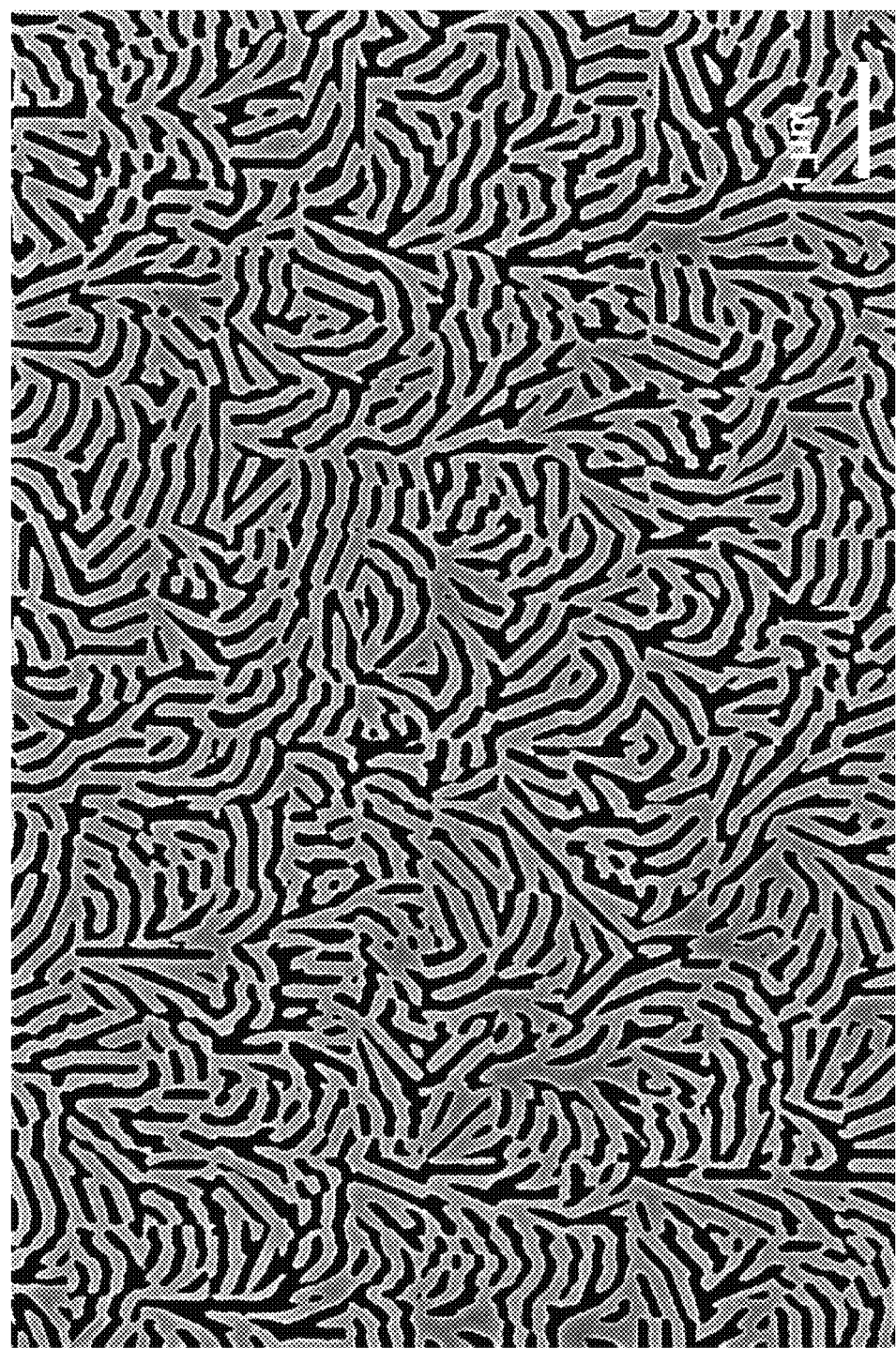
FIG. 15 illustrates a scanning electron microscope image of a fabricated multifunctional metasurface that comprises thousands of Si nanowire antennas in accordance with an embodiment of the invention.

To achieve effective spatial multiplexing, all the sub-elements of a single full metasurface lens are first divided into square segments in a checkerboard pattern in accordance with some embodiments of the invention. The segments can be as small as 600 nm×600 nm in accordance with a number of embodiments. Segments from each sub-element are then spatially multiplexed with equal area/weight in accordance with many embodiments. Significantly, by interleaving multiple optical elements, multifunctional wavefront shaping can be accomplished within one element without reducing the numerical aperture of each sub-element in accordance with embodiments of the invention. Moreover, the random arrangement/multiplexing can suppress the formation of diffracted orders, as observed in the diffraction patterns from periodic patterns. A multiplexed metalens that incorporates the array of lenses in accordance with an embodiment of the invention is shown in FIG. 14. The metasurface 1400 is fabricated using a nanopatterning technique. A scanning electron microscope image of a fabricated multifunctional metasurface that is comprised of thousands of Si nanowire antennas in accordance with an embodiment of the invention are shown in FIG. 15. The fabricated structure 1500 is 'flat' even though it incorporates many optical elements. The resulting metasurface optical element is also ultra-thin and can be easily inserted into the optical path of the system in accordance with many embodiments of the invention. In comparison, the phase profile of the microlens arrays is also implemented using the Si-based gradient metasurface optical elements.

Although various embodiments of a multiplexed metasurface lens array provided using DGMOEs in accordance with embodiments of the invention are discussed with reference to FIGS. 14 and 15, other multiplexed metasurface lens array provided using DGMOEs are possible without departing from embodiments of the invention.

Multifocal Spot Array Generate by Multiplexed Metasurface Lens Array

Figure 17:
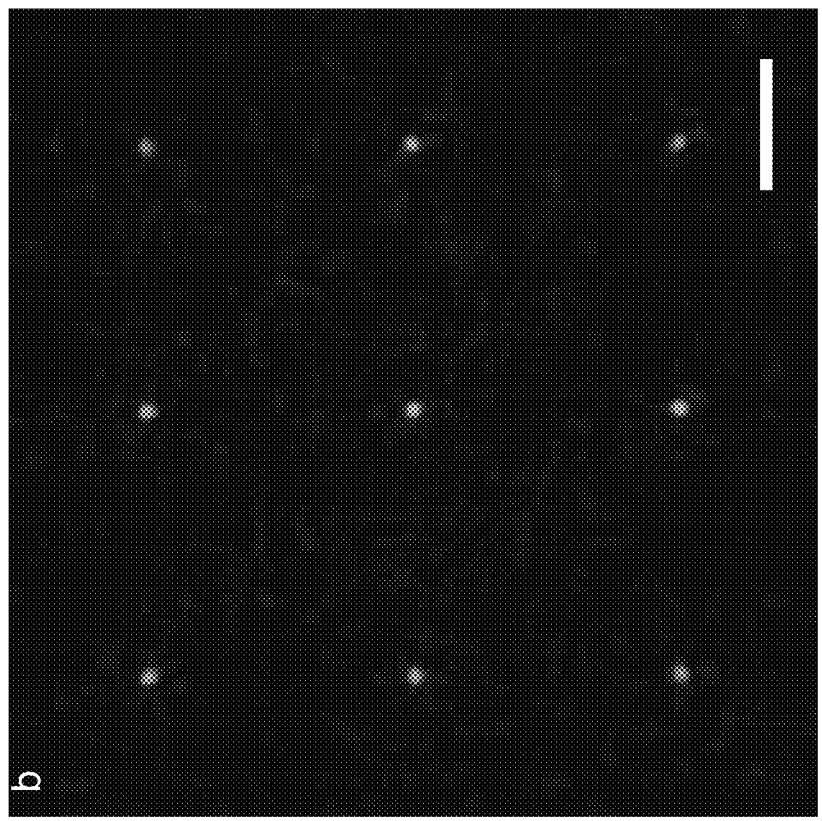
FIG. 17 illustrates a two-dimensional intensity profile on the focal plane in accordance with an embodiment of the invention measured using a confocal microscope.
Figure 16:
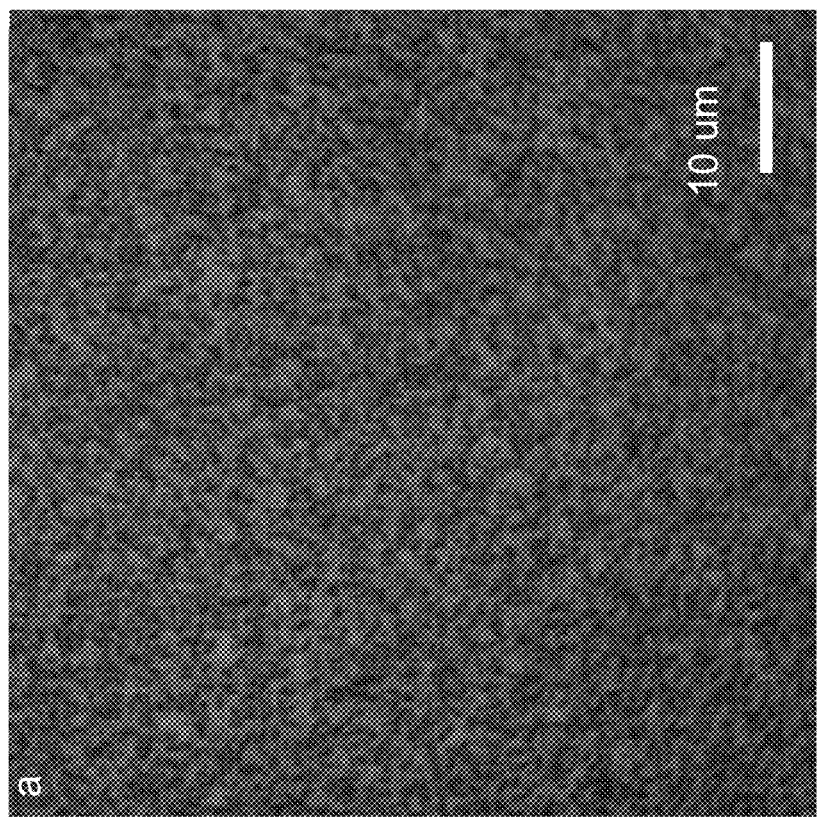
FIG. 16 illustrates an optical microscopy image of the multiplexed metasurface optical elements in accordance with an embodiment of the invention

An optical microscopy image of the multiplexed metasurface optical elements in accordance with an embodiment of the invention is shown in FIG. 16. When illuminated with a normally-incident light beam of left circular polarization (LCP) at a wavelength of 550 nm, the metalens in accordance with some embodiments of the invention is capable of focusing the light into an array of focal spots on the same focal plane. The operation of the lens could be analyzed by understanding all of the coherent far-field and near-field interactions between the Si nanobeam antennas. Alternatively, the behavior of the composite optical element can be described based on an understanding of the Pancharatnam-Berry (PB) phase. The two-dimensional intensity profile on the focal plane in accordance with an embodiment of the invention measured using a confocal microscope is shown in FIG. 17. The intensity profiles show nine focal spots at focal plane at distance of 100 um with translational separation of 20 um along the x and y axis respectively. The spot size of the focal spots of the multifunctional metalens is at the diffraction limit for the numerical aperture of a single full lens. Thanks to the multiplexing methods, the diameter of each sub-lens within multifunctional metalens is equal to that of a single lens, thus the metalens has the same numerical aperture as the single full lens.

Figure 18:
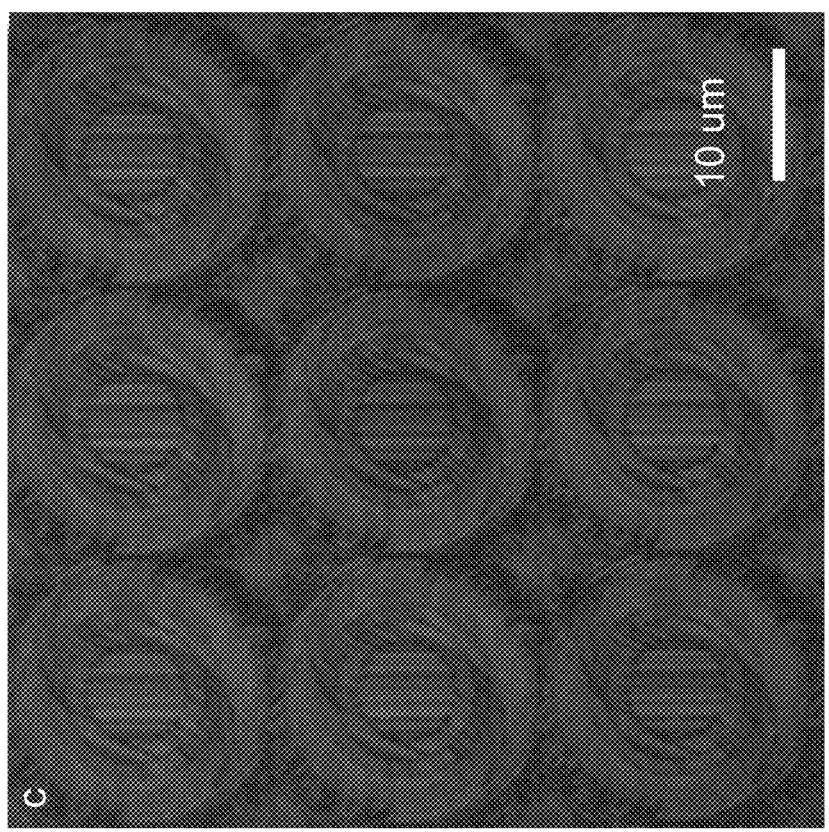

As a comparison, the optical microscopy image of a microlens array implemented using DGMOEs in accordance with an embodiment of the invention is shown in FIG. 18.

Figure 19:
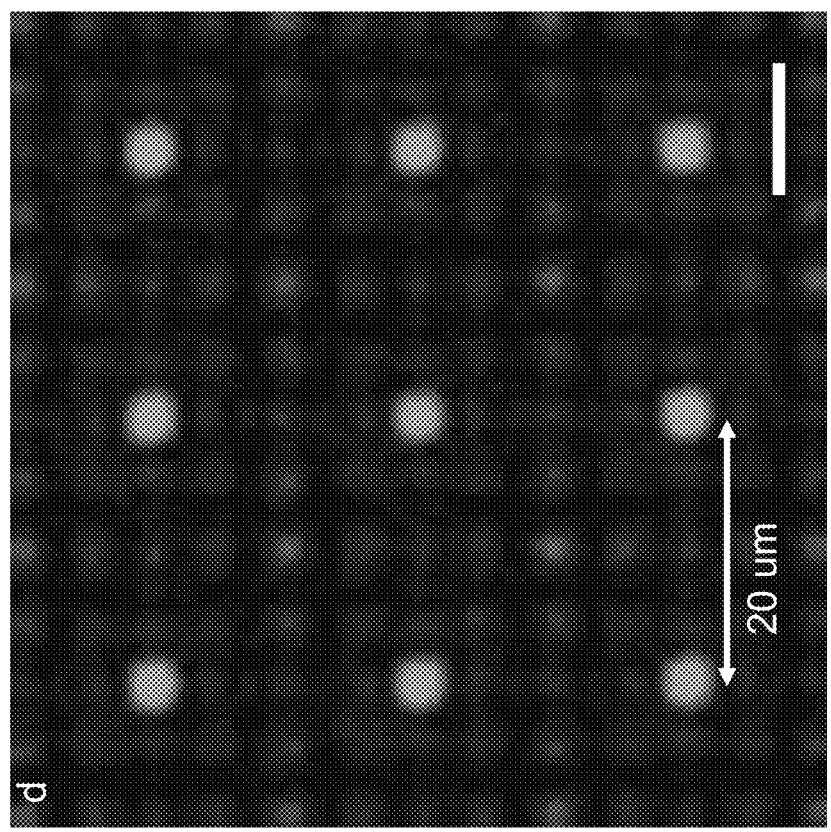
FIGS. 18 and 19 illustrate an optical microscopy image of a micro-lens array implemented using DGMOEs in accordance with an embodiment of the invention.

The image shows that the micro-lens array with lenslets translationally repeated and spatially-separated. The measured two-dimensional intensity profile on the focal plane of the micro-lens array using DGMOEs in accordance with an embodiment of the invention is shown in FIG. 19. Due to the more limited area of each lenslet and thus a smaller numerical aperture, the diameter of the focal spots generated by micro-lens array are more than 3 times as large as those for the multiplexed metasurface lens-array. Therefore, the multiplexed multifunctional metalens-array in accordance with some embodiments of the invention shows enhanced numerical aperture compared to those spatially separated multifunctional optical elements. Metalenses have the advantage of incorporating multiple functionalities in a single optical element without compromising resolution.

Due to the enhanced numerical aperture, the focal spots of a multiplexed metalens-array in accordance with some embodiments of the invention feature spot sizes that are much smaller than those of conventional microlens arrays. The larger aperture of each sub-lens directly translates into a higher spatial resolution in the imaging. Also random spatial multiplexing of metalens elements can suppress the higher diffracted order between focal spots as shown in FIG. 18. This can be a problem in microlens arrays as shown in FIG. 19. The peak/maximum intensity of focal spots is attenuated compared to a full single lens. Because the area that participates in the interference is only 1/N, the energy is distributed to multiple optical elements/focal spots. At the same time, this issue also exists in conventional micro-lens arrays.

Figure 20:
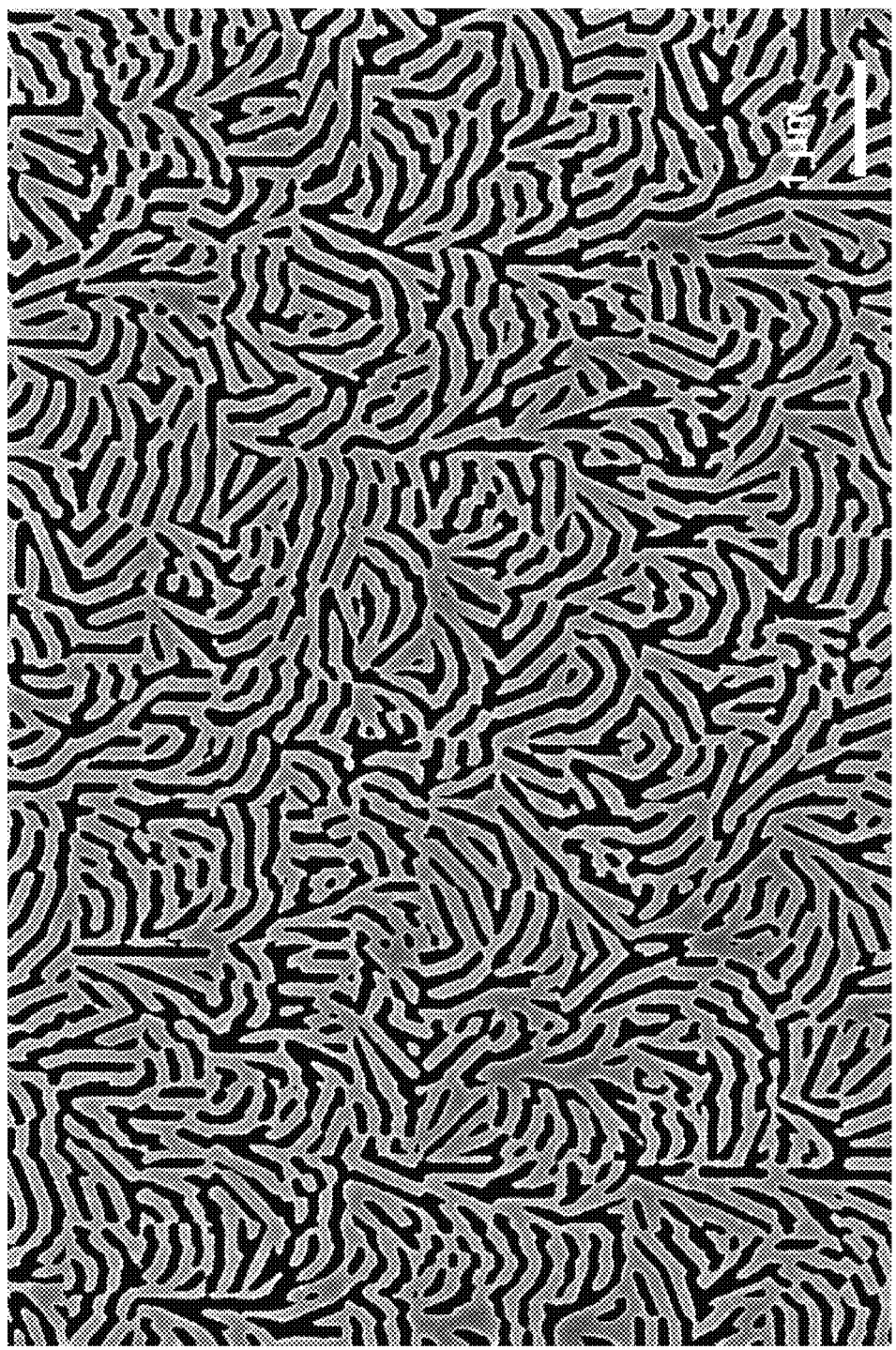
FIG. 20 illustrates the results of light-field imaging performed using the multifunctional metalens in accordance with an embodiment of the invention.

The realization of multifunctional metasurfaces in accordance with some embodiments of this invention open up a wide variety of applications including applications in the field of computation imaging and display. The results of light-field imaging performed using the multifunctional metalens in accordance with an embodiment of the invention shown in FIG. 20. The imaging system with an interleaved multifunctional metalens in accordance with some embodiments of the invention can be approximated as a superposition of multiple sub-lenses of a metasurface. Each single full metasurface lens works as a single lens imaging system with a designed focal length in accordance with some of these embodiments.

Light-Field Imaging Using a Multiplexed Metasurface Lens Array

Figures 21, 23:
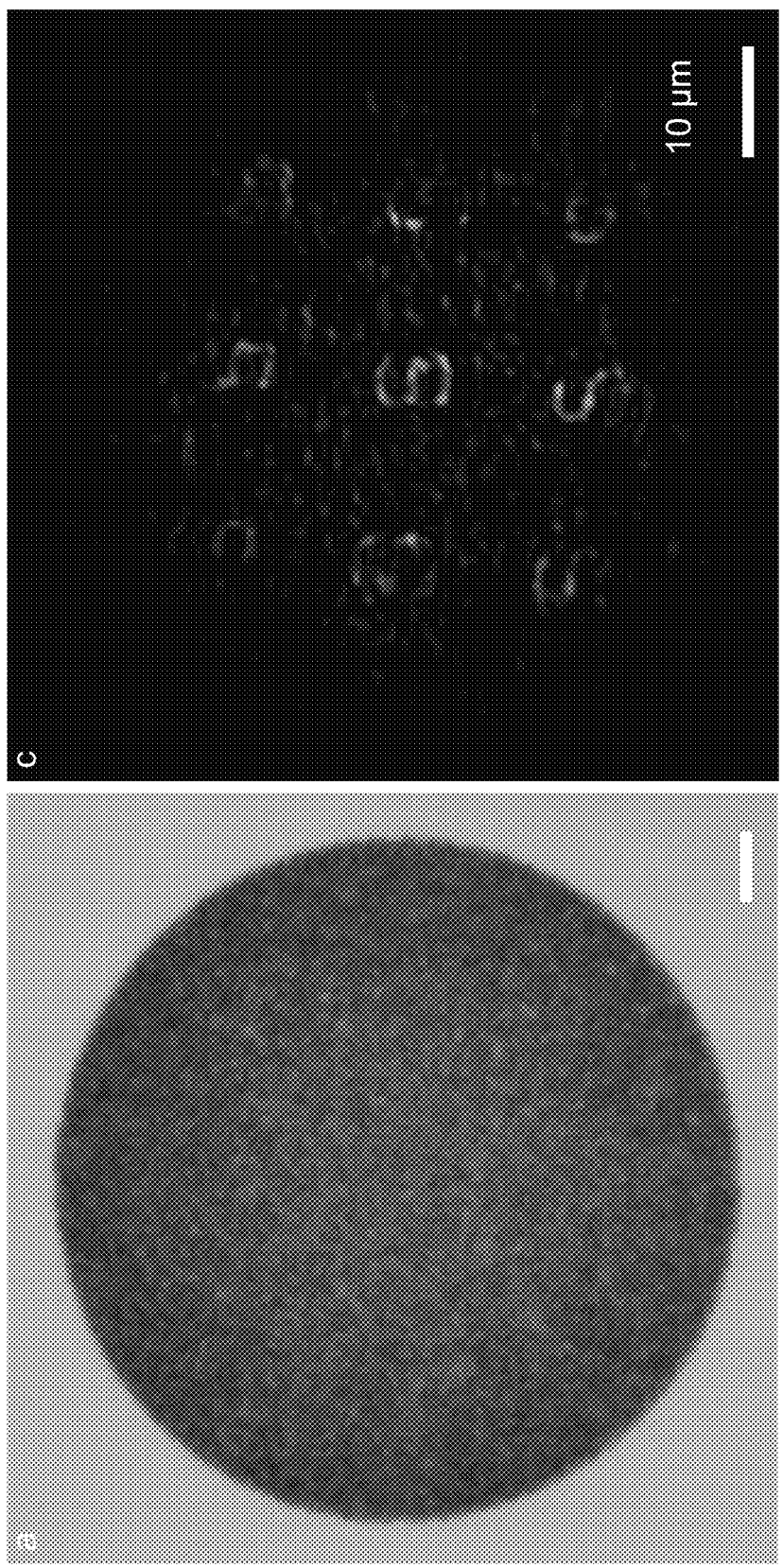
FIG. 21 illustrates the conventional optical microscopy image of a multiplexed metasurface lens array, which incorporates an array of lenses where the optical axes of the lens are translationally shifted in x and y.
FIG. 23 illustrates a light-field image taken with a metalens in accordance with an embodiment of the invention.
Figures 22, 24:
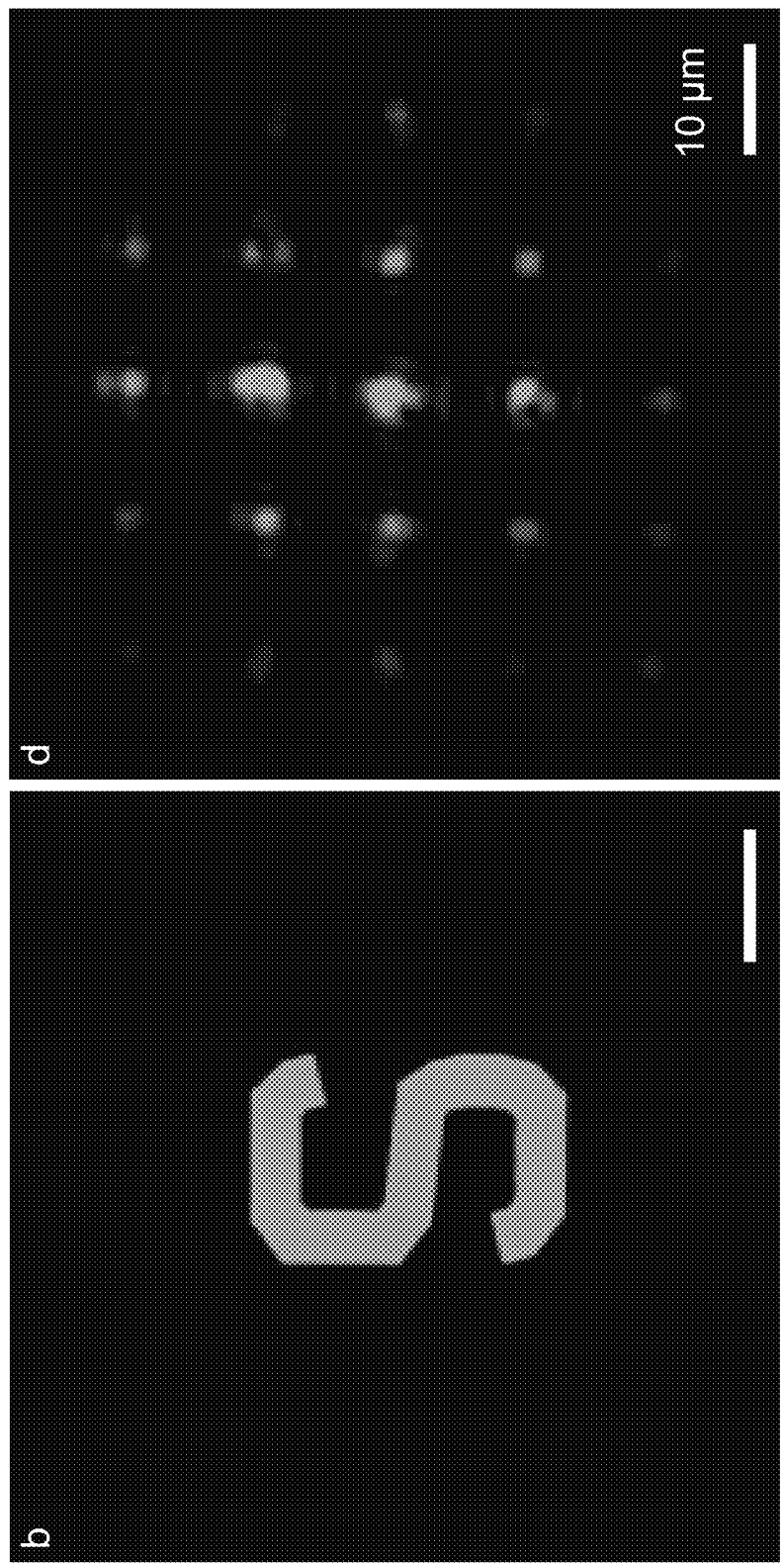
FIG. 22 illustrates an image of a multiplexed metasurface lens array in accordance with an embodiment of the invention.
FIG. 24 illustrates the image of the same target as FIGS. 21-23 captured with a spatially separated lens array

FIG. 21 shows the conventional optical microscopy image of the multiplexed metasurface lens array, which incorporates an array of lenses that have their optical axes translationally shifted in x and y. An object target with a clear pattern showing the letter 'S' on an aluminum background is shown. Upon illumination with a collimated laser at a wavelength of 550 nm, a conventional optical microscopy image of the object target is obtained in accordance with an embodiment of the invention, as shown in FIG. 22. In the imaging system with the multiplexed lens in accordance with some embodiments of the invention, each sub-lens will image the object from a different point of view. After the light passed through the metalens, different views from each sub-lens were separated into different steering directions. The views were focused in the image plane and projected at different locations near the optical axis of each sub-lens. The light-field image taken with the metalens is shown in FIG. 23 In comparison, FIG. 24 shows the image of the same target taken with a spatially separated lens array. The images confirm that the multiplexed metasurface lens array in accordance with some embodiments of the invention is capable of distinguishing the feature. Further, the spatially separated lens array cannot reproduce a clear image of the 'S' due to the reduced numerical aperture that decreases the spatial resolution. Therefore, the spatial resolution of a multiplexed metasurface lens array in accordance with some embodiments of the invention features an enhanced numerical aperture, which leads to higher spatial resolution in imaging than that of a spatially separated lens array.

The depth can be inferred from the relative position of the image compared to its optical axis, which is similar to what is observed in conventional light-field imaging. The light-field images from different views can be processed to generate the 3D image in accordance with a number of embodiments.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A multiplexed metalens array for a light-field imaging system comprising:
   a multiplexed dielectric gradient metasurface optical element;
   wherein the multiplexed dielectric gradient metasurface optical element comprises a plurality of optical sub-elements that are each a subset of the multiplexed gradient metasurface optical element;
   wherein each optical sub-element is divided into segments that are arranged in a nonperiodic pattern along the surface plane of the multiplexed gradient metasurface optical element such that each sub-element is dispersed and spatially interleaved with the other sub-elements into an integrated array, wherein the arrangement of each sub-element's segments results in a shared effective aperture among the subelements; and
   wherein each sub-element is configured to have a unique phase response such that each sub-element has a unique optical axis and focuses light derived from an object onto an image plane at a particular spatial location such that multiple perspectives of the object can be perceived on the image plane.

2. The multiplexed metalens array of claim 1 wherein at least two of the plurality of sub-elements have a different numerical aperture.

3. The multiplexed metalens array of claim 1 wherein at least two of the plurality of elements have a different focal length.

4. The multiplexed metalens array of claim 1 wherein each of the plurality of sub-elements have a coded aperture with additional phase modulation or an amplitude modulation incorporated therein.

5. The multiplexed metalens array of claim 1 wherein the plurality of sub-elements manipulate different states of polarization.

6. The multiplexed metalens array of claim 1 wherein the sub-elements are constructed with silicon nanobeam antennas; and wherein the phase response of each sub-element is based on geometric phase generated by the silicon nanobeam antennas.

7. The multiplexed metalens array of claim 1 wherein the plurality of sub-elements include N sub-elements and an intensity, I, of an image generated decreases as a function of N, wherein $I \sim 1/N^2$.

8. The multiplexed metalens array of claim 1 wherein the phase response of each sub-element produces a unique focal point such that an array of focal points is projected onto the image plane when illuminated with light derived from the object when the object is placed at infinity.

9. The multiplexed metalens array of claim 1 wherein the phase response of each sub-element is a light scattering phase response.

10. The multiplexed metalens array of claim 1 wherein the effective aperture of at least one sub-element is equal to the effective aperture equal of the full multiplexed dielectric gradient metasurface optical element.

11. The multiplexed metalens array of claim 1 wherein the multiplexed dielectric gradient metasurface optical element is incorporated into a light imaging system; and wherein the light imaging system includes at least one tube lens wherein one of the at least one tube lens is associated with one of the plurality of sub-elements to project an image from the one of the plurality of sub-elements onto a focal plane.

12. The multiplexed metalens array of claim 11 wherein the plurality of sub-elements includes N sub-elements and the at least one tube lens includes N tube lenses and each of the N sub-elements is associated with one of the N lens tubes to project the image from the one element onto the focal plane.

13. The multiplexed metalens array of claim 11 wherein the plurality of sub-elements includes N sub-elements and the at least one tube lens includes one lens tube and each of the N sub-elements is associated with the one tube lens to project an image onto the focal plane.

14. The multiplexed metalens array of claim 11 wherein at least two of the plurality of sub-elements have a different numerical aperture.

15. The multiplexed metalens array of claim 11 wherein at least two of the plurality of elements have a different focal length.

16. The multiplexed metalens array of claim 11 wherein each of the plurality of sub-elements have a coded aperture with additional phase modulation or an amplitude modulation incorporated therein.

17. The multiplexed metalens array of claim 11 wherein the plurality of sub-elements manipulate different states of polarization.

18. The multiplexed metalens array of claim 11 wherein the sub-elements are constructed with silicon nanobeam antennas; and wherein the phase response of each sub-element is based on geometric phase generated by the silicon nanobeam antennas.

19. The multiplexed metalens array of claim 11 wherein the plurality of sub-elements include N sub-elements and an intensity, I, of an image generated decreases as a function of N, wherein $I \sim 1/N^2$.

20. The multiplexed metalens array of claim 11 wherein the phase response of each sub-element produces a unique focal point such that an array of focal points is projected onto the image plane when illuminated with light derived from the object when the object is placed at infinity.

21. The multiplexed metalens array of claim 11 wherein the phase response of each sub-element is a light scattering phase response.

* * * * *